(No Model.)
R. J. COLVIN
GATE.
No. 255,940. Patented Apr. 4, 1882.
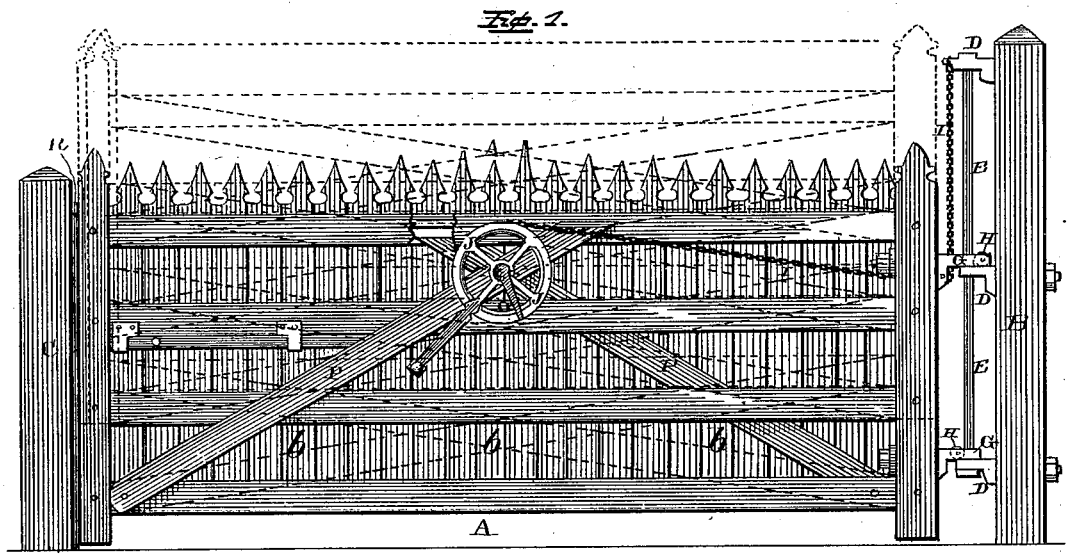
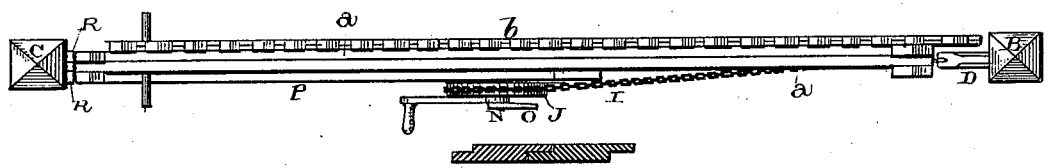
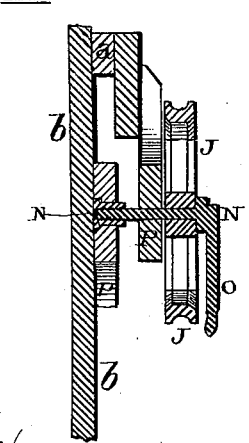
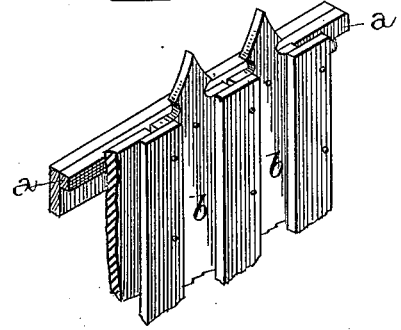
Witnesses.
W. W. Mortimer
W. H. Kern
Inventor.
R. J. Colvin
per
F. A. Lehmann,
Atty

UNITED STATES PATENT OFFICE.

ROBERT J. COLVIN, OF LANCASTER, PENNSYLVANIA.

GATE.

SPECIFICATION forming part of Letters Patent No. 255,940, dated April 4, 1882.

Application filed December 31, 1881. (No model.)

*To all whom it may concern:*

Be it known that I, ROBERT J. COLVIN, of Lancaster, in the county of Lancaster and State of Pennsylvania, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates.

It consists, first, in the combination of the gate, the hinged rod upon which the gate slides vertically, a chain, a wheel around which the chain is made to wind, and a clamp for locking the wheel in any desired position. The object of this part of my invention is to raise and lower the gate vertically by simply turning the wheel, and after the gate has been raised to the required position holding it there by means of the clamp.

It consists, second, in the combination of the gate with the two braces, which are pivoted to the lower bar of the gate and upon opposite sides, and through the upper ends of which braces is passed the clamping device, by means of which the braces are made to clamp the bars of the gate from opposite sides in such a manner as to hold the gate in any position required when it is either raised or lowered at its outer end. The object of this part of my invention is to so arrange the parts that the braces will have a much larger frictional contact upon the gate, and thus exert their hold upon every bar, instead of clamping the gate at only a single point.

It consists, third, in so shaping the edges of the panels that their adjoining edges can overlap, and thus form a close gate, which can be raised and lowered at either end the same as an adjustable gate. The object of this part of my invention is to make a close gate, and yet give it the same freedom of movement that either a picket or a bar gate has.

Figure 1 is a side elevation of my invention. Fig. 2 is a plan view of the same. Fig. 3 is a vertical cross-section. Fig. 4 is a detailed view.

A represents the gate; B, the post to which the gate is hinged, and C the post, against which the gate closes. The gate may be a panel-gate, a picket-gate, or a closed gate, which will consist of both panels and vertical bars, which bars are attached to it in a vertical position, so as to make a tight gate, as shown in Fig. 1.

Secured to the post B, to which the gate is hinged, are the three bearings or supports D, through which passes the vertical rod E, upon which the gate is hung. These three supports D are placed at equal distances apart, so as to brace the rod in such a manner as to prevent it giving or springing while the gate is being raised, lowered, or opened.

Secured to the gate are the two hinges G, through both of which the vertical rod E passes, and each one of which hinges is provided with a friction roller or pulley, H, and which are applied to the rod upon opposite sides, so as to reduce the friction while the gate is being raised and lowered as much as possible. I do not confine myself to the use of these friction-rollers, because the gate can be raised and lowered without them; but where the rollers are not used there will be a greater effort required in raising the gate upward. Each one of the hinges is provided with a screw-shank, which passes in between the two vertical uprights at the inner end of the gate, and upon these shanks is screwed a combined cap-nut and washer, which is made together in a single piece. The square shoulder which is formed near the center of each hinge abuts against a perforated plate, which is applied to the outer edge of the uprights, and the hinge is then clamped in position by means of the washer and cap-nut. Through the upper hinge is made a vertical hole, and through this hole passes the chain I, by means of which the gate is raised and lowered vertically upon the pivotal rod. In this hinge is also secured a small guiding-pulley, around which the chain passes, so that there will be as little friction as possible as the gate is being raised or lowered. The upper end of this chain is fastened in any suitable manner to one of the bearings for the vertical pivotal rod upon which the gate swings, passed down through the hole in the hinge, around the pulley, horizontally along the side of the gate to where the shift-wheel J is applied, and the chain has its inner end fastened to this wheel in any suitable manner. This shift-wheel has a grooved edge, so as to receive the chain and prevent it from readily slipping off, and the wheel acts as a lever, by means of which the gate can be raised vertically upon its pivotal rod. This gate is given a perpendicular movement for the purpose of raising it horizontally from the ground from one inch or more to four and a half feet, if necessary. By raising the gate horizontally upward small stock can pass freely under its lower edge, while the larger stock will be confined to the field or yard in which they are kept.

In order to hold the gate in any position in which it may be adjusted, the clamping-bolt N is used, which passes horizontally through the shift-wheel, through the two braces which are applied to opposite sides of the gate, and into a box which is provided with a thread to correspond with the bolt. This clamping-bolt is provided with a suitable handle or lever, O, so that it can be turned freely around for the purpose of tightening or loosening it. After the gate has been raised upward to any desired height by turning the shift-wheel, which is also provided with an operating-lever, the clamping-bolt is turned by means of its handle, so as to clamp the shift-wheel tightly against the brace, and this will prevent the shift-wheel from turning, so as to allow the chain to unwind and the gate to descend. When it is desired to lower the gate to its full extent, or to any intermediate point, it is only necessary to loosen the clamping-bolt, when the gate will descend from its own weight to the position required, when the clamping-bolt may be again tightened.

The two braces P, which extend diagonally toward the center of the gate, are bolted to the lower panels and upon opposite sides of the gate, so as to clamp the panel of the gate between them. As the clamping-bolt passes through these two braces it will readily be seen that the braces are tightened by the turning of the clamping-bolt against the panels of the fence in such a manner as to hold the gate between them. By means of this construction the two braces are not simply tightened upon a single panel of the fence and at a single point, but are made to clamp nearly the entire gate from one end to the other, thus making a stronger and a better gate than when applied in any other manner. The upper ends of these braces have no movement when the gate is being raised diagonally from either one of its ends, but the horizontal panels of the fence move back and forth between the braces. It is not necessary that the upper ends of these braces should come just opposite the center of the gate, for one of the braces may be made longer than the other, and their upper ends may be either right or left of the center.

The horizontal bars of the gate being pivoted between the vertical uprights at each end, the gate can be raised or lowered at either end, so as to conform to the sides of a hill, uneven ground, or so as to be raised just sufficiently to pass over snow-drifts. Should the snow-drift be very deep the gate will be raised vertically upon its pivotal rod a suitable distance and then clamped in that position, while either end of the gate may then be raised or lowered diagonally, so as to pass over the drift more readily.

Secured to the inner side of the post against which the gate closes are two horizontal cleats, R, which are separated just far enough to allow the end of the latch to catch between them. These cleats will extend up as high as the top of the post, or to any suitable distance above its top, so that after the gate is raised upward the latch will fasten and prevent the gate from opening in any manner, as when the gate is at its lowest position. The latch of the gate is applied to the edge of one of the horizontal bars, and is held in position by suitable guides, in the rear one of which is placed a suitable spring, which will force the outer end of the latch outward, so that it will catch between the cleats.

When a perfectly tight or closed gate is desired, as shown in Figs. 1 and 4, a strip, a, is secured to the outer side of the top and bottom panels of the fence, so as to throw the pickets outward from the sides of the panels far enough to allow the diagonal brace P, which comes on that side of the gate, to be placed between the panels and the pickets. The pickets b are then nailed to these strips a, and between the top of the brace and the top strip there is left enough space to allow the gate to be depressed at its outer end. The edges of the pickets b are rabbeted, so as to catch over each other, and thus close up all cracks and form a tight gate. Between the edges of the pickets there must be left enough space to provide for the swelling of the wood when wet, and thus enable the pickets to move without unnecessary friction. These vertical parts allow the gate to be raised upward at either end as freely as though the gate was made of panels or pickets alone. The cracks between the uprights may be closed by nailing a narrow strip over the adjoining edges, as shown in the detail view; but this way of closing them is more expensive, as it requires more lumber and time.

Having thus described my invention, I claim—

1. The combination of a gate, the pivotal rod E, upon which the gate swings and is raised and lowered, the chain I, wheel J, braces P, and clamping-bolt N, substantially as shown.

2. The combination of a gate which can be adjusted diagonally from its corners with a series of uprights having rabbeted edges, whereby the uprights are made to form a closed gate, substantially as described.

3. The combination of the gate, the two braces which are applied to opposite sides of the gate and extend in diagonal opposite directions, a clamping-bolt and shift-wheel, the chain, and a vertical rod, upon which the gate moves, substantially as specified.

4. The combination of the gate, the upper hinge having a vertical opening for the passage of the chain, and provided with a friction-roller, with the shift-wheel, the clamp, the diagonal braces, and the chain, substantially as described.

In testimony whereof I affix my signature in presence of two witnesses.

ROBT. J. COLVIN.

Witnesses:
W. H. KERN,
W. W. MORTIMER.